United States Patent [19]
Goto

[11] Patent Number: 6,031,664
[45] Date of Patent: *Feb. 29, 2000

[54] TRANSMISSION TYPE PROJECTOR SCREEN UTILIZING PARALLEL OPTICAL SHEETS AND PRISM LENSES

[75] Inventor: Masahiro Goto, Tokyo-To, Japan

[73] Assignee: Dai Nippon Printing Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,942

[22] Filed: Jul. 28, 1997

[30] Foreign Application Priority Data

Jul. 29, 1996 [JP] Japan .................................. 8-198691

[51] Int. Cl.[7] .................................................. G03B 21/60
[52] U.S. Cl. .......................... 359/456; 359/457; 359/460
[58] Field of Search .................... 359/456, 457, 359/460, 742, 443, 455

[56] References Cited

U.S. PATENT DOCUMENTS

| | | | |
|---|---|---|---|
| 4,185,901 | 1/1980 | Behr | 353/27 R |
| 4,473,277 | 9/1984 | Brown | 350/399 |
| 4,512,631 | 4/1985 | VanBreemen | 350/128 |
| 5,513,036 | 4/1996 | Watanabe et al. | 359/457 |
| 5,703,722 | 12/1997 | Blankenbecler | 359/653 |
| 5,774,260 | 6/1998 | Petitto et al. | 359/451 |

FOREIGN PATENT DOCUMENTS

| | | | |
|---|---|---|---|
| 54092338 | 7/1979 | European Pat. Off. . | |
| 03051252 | 3/1991 | European Pat. Off. . | |
| 59-119340 | 7/1984 | Japan | 359/457 |
| 63-110434 | 5/1988 | Japan | 359/457 |

*Primary Examiner*—David M. Gray
*Assistant Examiner*—Christopher E. Mahoney
*Attorney, Agent, or Firm*—Morgan & Finnegan LLP

[57] ABSTRACT

A transmission type projection screen comprises a plurality of sheets. The front sheet nearest to the front observation side is an ambient light attenuating front sheet which is provided on its surface facing the rear side with first prism lenses formed by successively and horizontally arranging unit triangular prisms. Each unit triangular prism has a sharply inclined surface inclined at an angle of about 90° to the surface of the front sheet, and a gently inclined surface inclined at an angle in the range of 5° to 40° to the surface of the front sheet. The first prism lenses are disposed with the gently inclined surfaces of the unit triangular prisms thereof facing upward. Second prism lenses may be provided on its surface facing the front observation side, each of the second prism lenses also having a sharply inclined surface and a gently inclined surface.

13 Claims, 3 Drawing Sheets

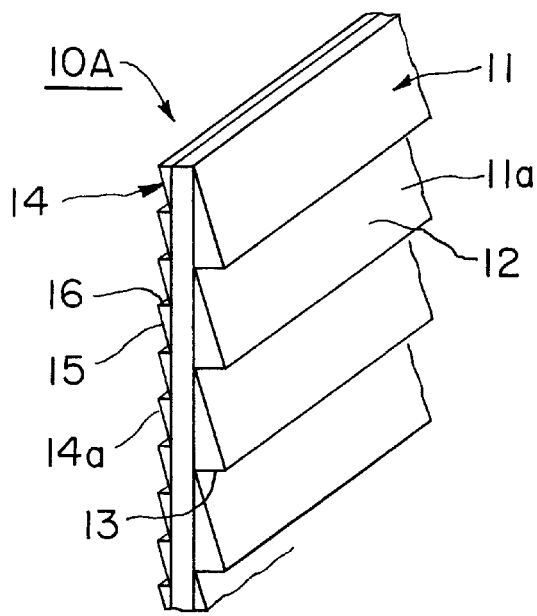
F I G. 3
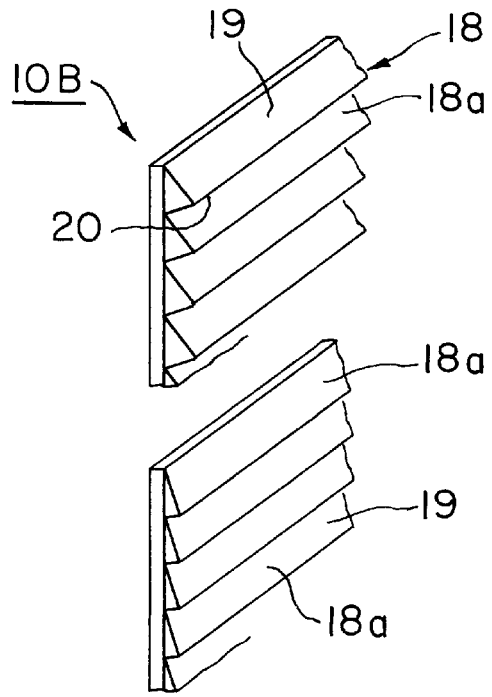
F I G. 4

TRANSMISSION TYPE PROJECTOR SCREEN UTILIZING PARALLEL OPTICAL SHEETS AND PRISM LENSES

BACKGROUND OF THE INVENTION

1. Field of the Invention

The present invention relates to a transmission type projection screen for use, for example, on a rear projection television receiver or the like.

2. Description of the Related Art

A conventional transmission type projection screen of this kind having a lenticular lens sheet is provided on a light emitting surface of the lenticular lens sheet with light absorbing stripes, i.e., black stripes, to prevent the reduction of contrast due to ambient light. Another conventional transmission type projection screen having a lenticular lens sheet is provided on the front side of the lenticular lens sheet with a transparent flat plate made of a material containing a light absorbing dye or pigment.

Those conventional transmission type projection screens have such problems that it is difficult to form the light absorbing stripes if the lenticular lenses of the lenticular lens sheet is formed at small pitches to display pictures in an improved resolution, and that the reduction of contrast due to ambient light is unavoidable, and hot bands, i.e., stripes of high brightness, are formed due to irregular luminance distribution with respect to vertical directions in which light is diffused in a narrow range.

SUMMARY OF THE INVENTION

Accordingly, it is an object of the present invention to provide a transmission type projection screen capable of displaying pictures in a remarkably improved contrast and of suppressing the formation of hot bands.

According to the present invention, a transmission type projection screen comprises a plurality of sheets, and the front sheet nearest to a front side, i.e., the viewer's side, is an ambient light attenuating front sheet provided on its surface facing a rear side, i.e., the side of a light source, with first prism lenses formed by successively and horizontally arranging unit triangular prisms in parallel.

The first prism lens may control light in a vertical direction.

The first prism lens may be constructed by arranging unit triangular prisms each having a sharply inclined surface inclined at about 90° to the surface of the front sheet, and a gently inclined surface inclined at an angle in the range of 5° to 40° to the surface of the front sheet.

The first prism lenses may be disposed with the gently inclined surfaces of the triangular prisms thereof facing upward.

The angle of the gently inclined surfaces in upper portions of the first prism lenses may be greater than that of the gently inclined surfaces in lower portions of the first prism lenses.

The ambient light attenuating front sheet nearest to the front observation side may be provided on its surface on the front side with second prism lenses having successive unit triangular prisms arranged horizontally in parallel.

The second prism lenses may be constructed by arranging unit triangular prisms each having a sharply inclined surface inclined at about 90° to the surface of the front sheet, and a gently inclined surface inclined at an angle in the range of 5° to 40° to the surface of the front sheet, the gently inclined surfaces facing downward.

The angle of the gently inclined surface of each of the unit triangular prisms of the second prism lenses is smaller than that of the gently inclined surface of each of the unit triangular prisms of the first prism lenses.

The ambient light attenuating front sheet may be made of a material containing a light absorbing dye or pigment.

The surface on the front side of the ambient light attenuating front sheet may be coated with an antireflection coat.

BRIEF DESCRIPTION OF THE DRAWINGS

The above and other objects, features and advantages of the present invention will become more apparent from the following description taken in connection with the accompanying drawings, in which:

FIG. 3 is a fragmentary perspective view of a transmission type projection screen according to a second embodiment of the present invention; and FIG. 4 is a fragmentary perspective view of a transmission type projection screen according to a third embodiment of the present invention.

DESCRIPTION OF THE PREFERRED EMBODIMENTS

First Embodiment

Figure 1:
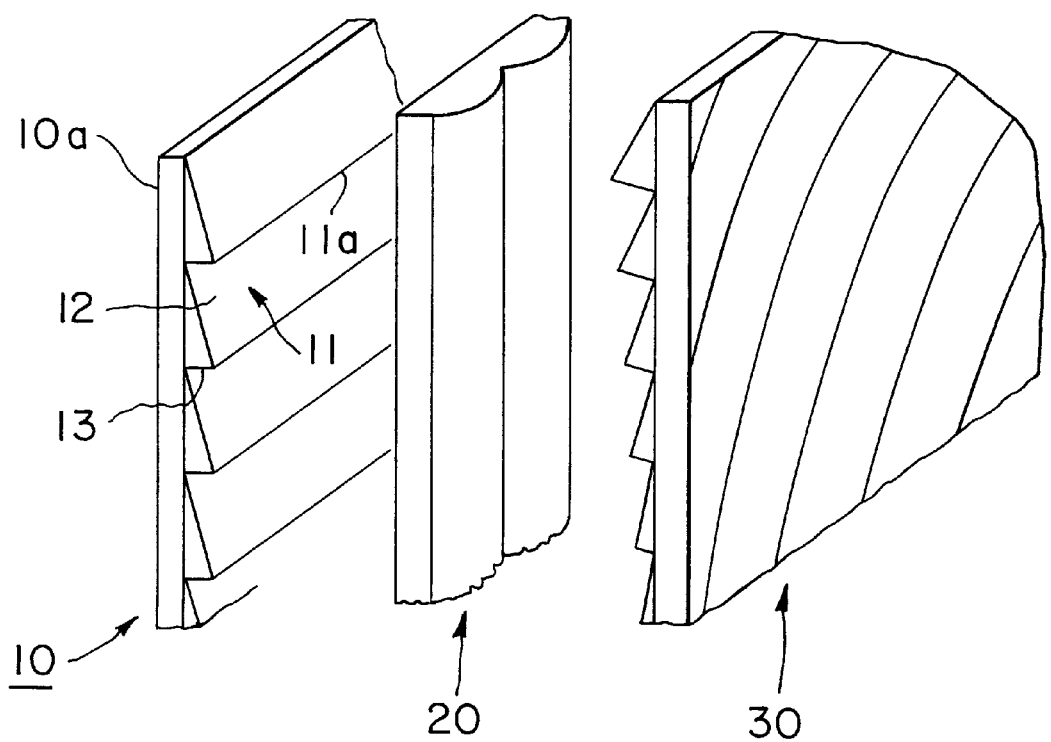
FIG. 1 is a fragmentary perspective view of a transmission type projection screen according to a first embodiment of the present invention.
Figure 2:
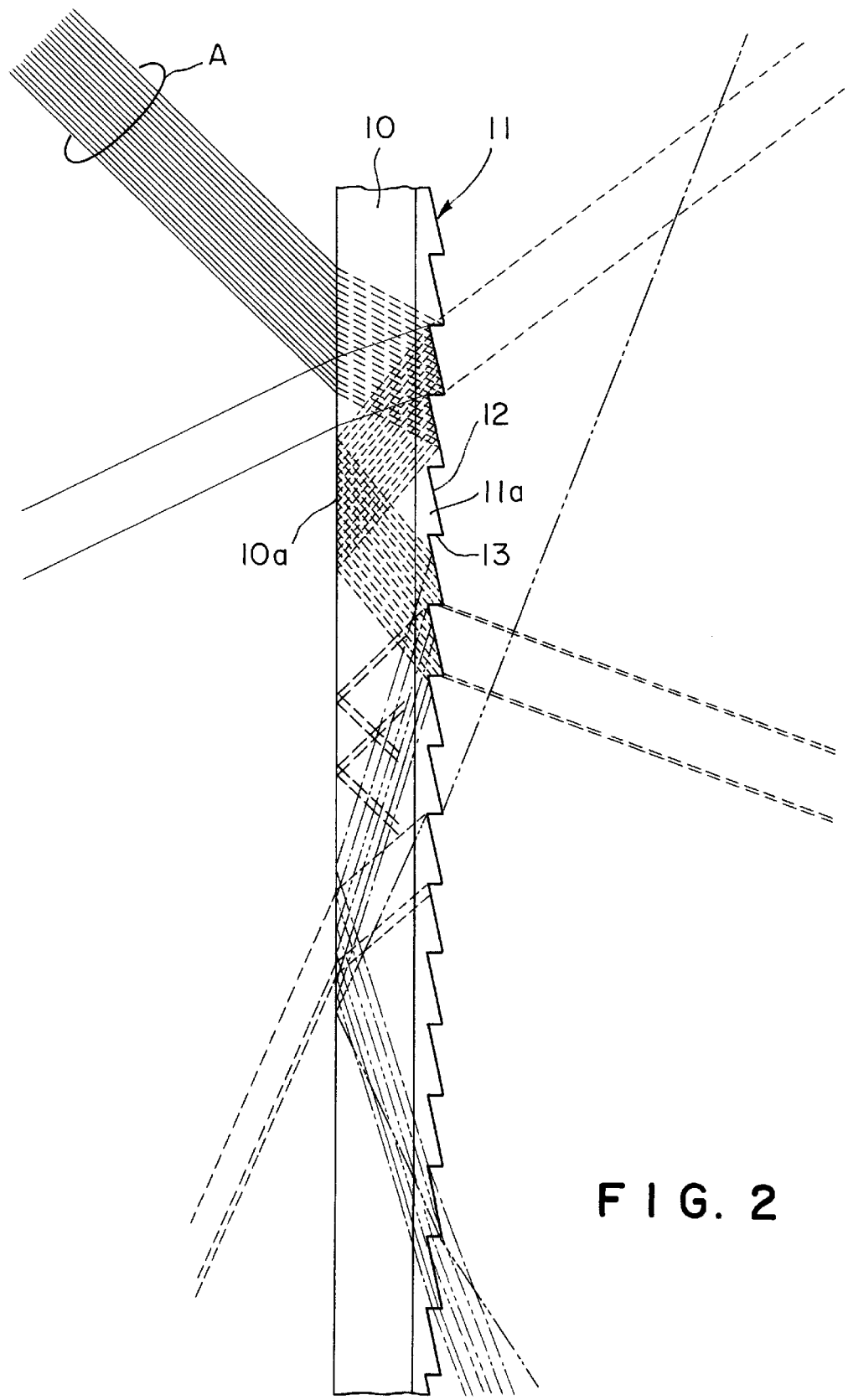
FIG. 2 is a diagrammatic view of the transmission type projection screen of FIG. 1, showing passages of ambient light falling on the projection screen.

Referring to FIGS. 1 and 2, a rear projection screen according to a first embodiment of the present invention comprises an ambient light attenuating front sheet 10, a lenticular lens sheet 20 and a Fresnel lens sheet 30 arranged in that order from the front side, i.e., the observation side, toward the rear side, i.e., the light source side. The ambient light attenuating front sheet 10 has a flat front surface 10a, and first prism lenses 11 on the rear side of the sheet 10. The front surface 10a is the surface for observation. The first prism lenses 11 are formed by successively arranging parallel unit triangular prisms 11a each having a gently inclined surface 12 facing upward and a sharply inclined surface 13 facing downward. The gently inclined surface 12 is inclined at an angle in the range of 5 to 40° to the rear surface or major plane of the front sheet 10. In the embodiment shown, the gently inclined surface 12 is inclined at an angle of 12° to the rear surface of the front sheet 10. The sharply inclined surface 13 is inclined at an angle of 90°, for example, to the rear surface. The unit triangular prisms 11a are placed at pitches of 0.1 mm. The front surface 10a of the front sheet 10 is applied with an antireflection coating to suppress the specular reflection of light by the front surface 10a, and the front sheet 10 is formed of a material containing a light absorbing dye or pigment.

The lenticular lens sheet 20 is made of a material containing a light absorbing agent. The Fresnel lens sheet 30 is disposed with its optical center shifted 50 mm upward to compensate for a downward inclination of the optical axis by the first prism lenses of the ambient light attenuating front sheet 10. As will be understood from the following description with reference to FIG. 2, the ambient light attenuating front sheet 10 has the unit triangular prisms 11a that cause the image light from the rear side to be directed obliquely downward through the front surface 10a. This has the effect of downward inclination of the optical axis. To compensate for this, the optical center of the Fresnel lens sheet 30 is shifted upward by 50 mm, for example. By doing so, the image light will be emitted obliquely upward from the Fresnel lens 30 and enter the front sheet 10 in an obliquely upward direction so that the image light will be directed horizontally as viewed in FIG. 1. Thus the observer in front of the front sheet 10 can observe the image which is brightest in the central area of the front sheet 10.

With reference to FIG. 2, ambient light rays A traveling obliquely downward and falling on the front surface 10a of the front sheet 10 at an angle of 45°, for example, to the front surface 10a are trapped by the ambient light attenuating front sheet 10 to suppress falling of the ambient light rays A on the lenticular lens sheet 20 that has a diffusing function. More specifically, as shown in FIG. 2, the ambient light rays A falling on the flat front surface 10a of the front sheet 10 and traveling toward the prism lenses 11 on the rear side are reflected by the prism lenses 11 in a total reflection mode toward the front surface 10a, and the light rays A reflected toward the front surface 10a are reflected by the front surface 10a also in a total reflection mode. Thus the reflection of the light rays A is repeated within the ambient light attenuating front sheet 10 containing the light absorbing dye or pigment. Consequently, the ambient light rays A are absorbed and attenuated.

Experiments showed that the ambient light attenuating front sheet 10 absorbed and attenuated effectively ambient light rays traveling obliquely downward and falling on the front surface 10a of the front sheet 10 at an angle of 45° to the front surface 10a, and only ⅕ of the incident ambient light rays could fall on the lenticular lens sheet 20. Consequently, this transmission type projection screen could display pictures in a greatly improved contrast.

Second Embodiment

In the following description, parts like or corresponding to those of the first embodiment are designated by the same reference characters and the description thereof will be omitted to avoid duplication.

A transmission type projection screen according to a second embodiment of the present invention is similar in configuration to the rear projection screen of the first embodiment, except that the second embodiment employs an ambient light attenuating front sheet 10A shown in FIG. 3 different from that of the first embodiment.

As shown in FIG. 3, the ambient light attenuating front sheet 10A has second prism lenses 14 formed on its front surface and first prism lenses 11 formed on its rear surface. The first prism lenses 11 are formed by successively arranging unit triangular prisms 11a each having a gently inclined surface 12 facing upward and inclined at an angle of 20° to the rear surface of the front sheet 10A, and a sharply inclined surface 13 facing downward and inclined at an angle of 90° to the rear surface of the front sheet 10A. The second prism lenses 14 are formed by successively arranging unit triangular prisms 14a each having a gently inclined surface 15 facing downward and inclined at an angle of 5 to 40° to the front surface, and a sharply inclined surface 16 facing upward and inclined at an angle of 90°, for example, to the front surface. The angle of inclination of the surface 15 is 10° in the second embodiment.

The angle of the gently inclined surface 15 is smaller than that of the gently inclined surface 12 to enable the gently inclined surface 12 to reflect light rays falling obliquely downward thereon in a total reflection mode. The second prism lenses 14 also suppress the specular reflection of light incident on the front surface of the transmission type projection screen. That is, the gently inclined surfaces 15 reflect ambient light downward outside the observer's sight.

Third Embodiment

A transmission type projection screen according to a third embodiment of the present invention shown in FIG. 4 is similar in configuration to the projection screen of the first embodiment, except that the third embodiment employs an ambient light attenuating front sheet 10B having on the rear surface prism lenses that are different from the prism lenses 11 of the first embodiment.

As shown in FIG. 4, the ambient light attenuating front sheet 10B has first prism lenses 18 formed on its rear surface. The first prism lenses 18 are formed by successively arranging unit triangular prisms 18a at pitches of 0.1 mm. A top unit triangular prism 18a of the prism lenses 18 has a gently inclined surface 19 facing upward and inclined at an angle of 18° relative to the rear surface of the front sheet 10B, and a bottom unit triangular prism 18a of the same has a gently inclined surface 19 facing upward and inclined at an angle of 6° relative to the rear surface. In the prism lenses 18, the angle of the gently inclined surfaces 19 of the uppermost unit triangular prism 18a is greater than that of the gently inclined surfaces 19 of the lowermost unit triangular prisms 18a. The angle of the inclined surfaces 19 decreases gradually from the uppermost triangular prism to the lowermost triangular prism.

This gradual decrease of the angle of the inclined surfaces 19 is advantageous for the following reasons. It will be understood from FIG. 2 that ambient light rays A fall at a greater angle to the front surface 10a on the upper region of the front surface 10a than on the lower region of the front surface 10a. For this reason, in order to have total reflection take plate within the upper portion of the front sheet 10, the angle of the gently inclined surfaces 19 in the upper portion must be so great as to reflect incident ambient light rays in a direction to cause repetitive total reflection within the front sheet 10, while the angle of the gently inclined surfaces 19 in the lower portion of the front sheet 10 need not be so great as in the upper portion. For this reason, the angle of the inclined surfaces 19 is gradually decreased from the upper side to the lower side in the third embodiment.

This gradual decrease of the angle also serves to eliminate a "hot band" phenomenon wherein the central portion of the projection screen is bright while upper and lower portions of the projections screen are dark. Image light rays coming to the rear side of the front screen 10B are refracted by the gently inclined surfaces 19 in obliquely more downward directions in the upper region and in obliquely less downward directions in the lower regions. Therefore, image light rays that have passed through the front sheet 10B are converged with respect to the vertical direction and directed to the observer, whereby the observer feels uniform brightness of the projection screen.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A transmission type projection screen comprising:
   a plurality of parallel optical sheets arranged perpendicularly to an optical axis, said optical sheets including a front sheet having a front surface exposed directly to an observation side and a rearmost sheet having a surface facing a light source which emits light that passes substantially along said optical axis through said rearmost sheet and then through said front sheet to said observation side, said front sheet having a rear surface opposite to said front surface; and a plurality of prism lenses formed on said rear surface of said front sheet and including unit triangular prisms extending in a first direction along said rear surface and disposed in a succeeding arrangement, wherein each of the unit triangular prisms has a first inclined surface and a second inclined surface, and wherein the angle between said second inclined surface and said rear surface is less than the angle between said first inclined surface and said rear surface, said first inclined surface being so inclined as to internally reflect an outside light coming from the observation side into each unit triangular prism, to a direction inclined to said optical axis to remove said outside light out of viewer's sight.

2. The transmission type projection screen according to claim 1, wherein said first inclined surface makes a right angle to said rear surface.

3. The transmission type projection screen according to claim 1, wherein said second inclined surface makes an angle in the range of 5° to 40° to said rear surface.

4. The transmission type projection screen according to claim 1, wherein said plurality of first prism lenses are disposed with said second inclined surface facing upward.

5. The transmission type projection screen according to claim 1, wherein said unit triangular prisms include an uppermost prism, a lowermost prism and intermediate prisms between said uppermost and lowermost prisms, the second inclined surfaces of the prisms having an angle with respect to said rear surface that decreases gradually from the uppermost prism to the lowermost prism.

6. The transmission type projection screen according to claim 1, further comprising:

a second plurality of prism lenses formed on said front surface of said front sheet and including unit triangular prisms extending parallel to said first plurality of prisms and in a succeeding arrangement.

7. The transmission type projection screen according to claim 6, wherein each of the unit triangular prisms of said second plurality of prism lenses has a first inclined surface and a second inclined surface, wherein the angle between said second inclined surface and said front surface is less than the angle between said first inclined surface and said front surface.

8. The transmission type projection screen according to claim 7, wherein the angle between said first inclined surface of the second plurality of prisms and said front surface is a substantially right angle.

9. The transmission type projection screen according to claim 7, wherein the angle between said second inclined surface of the second plurality of prisms and said front surface is in the range of 5° to 40°.

10. The transmission type projection screen according to claim 7 wherein said second plurality of prisms are disposed with the second inclined surface thereof facing downward.

11. The transmission type projection screen according to claim 1, wherein said front sheet is made of a material containing a light absorbing dye or pigment.

12. The transmission type projection screen according to claim 1, wherein said front surface of said front sheet has an antireflection coating.

13. The transmission type projection screen according to claim 1, wherein said rearmost sheet is a Fresnel lens sheet and a lenticular lens sheet is interposed between the front sheet and the Fresnel lens sheet.

* * * * *